Oct. 16, 1962 R. P. CAHN 3,059,037
EXTRACTIVE DISTILLATION PROCESS
Filed Sept. 1, 1959 2 Sheets-Sheet 2
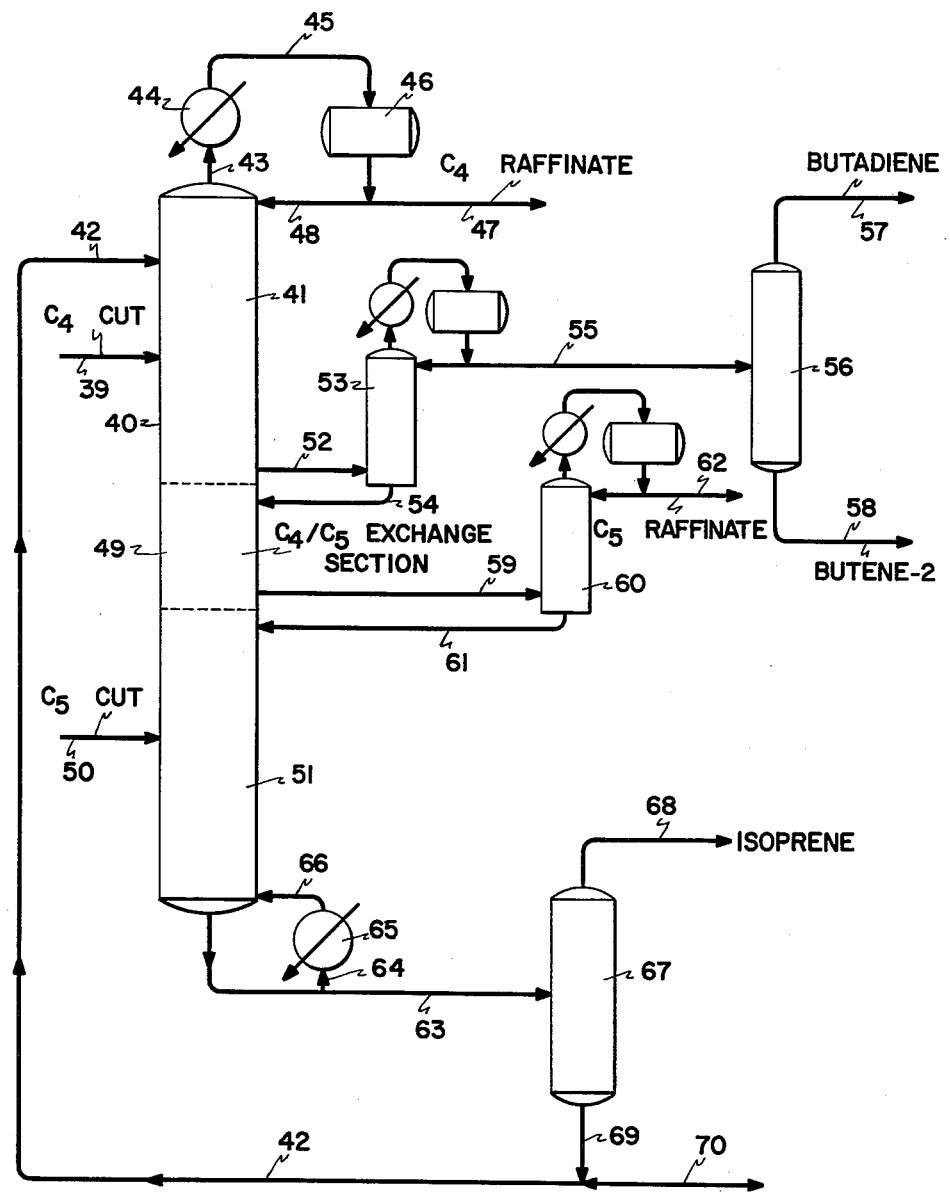
FIG.-II
ROBERT P. CAHN INVENTOR
BY Peter H. Smolka
PATENT ATTORNEY United States Patent Office 3,059,037
Patented Oct. 16, 1962

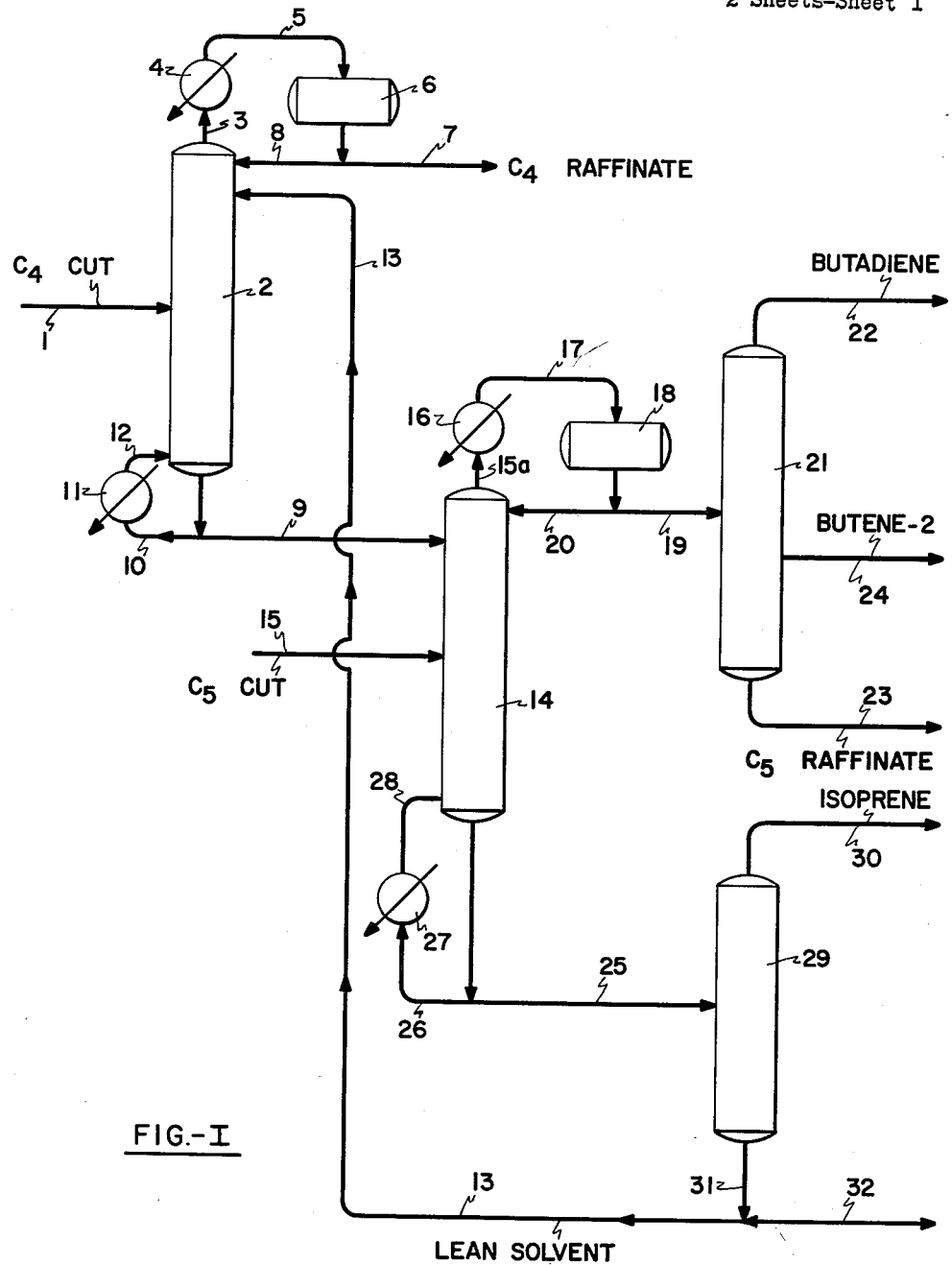
FIG.-I

3,059,037
EXTRACTIVE DISTILLATION PROCESS
Robert P. Cahn, Elizabeth, N.J., assignor to Esso Research and Engineering Company, a corporation of Delaware
Filed Sept. 1, 1959, Ser. No. 837,491
14 Claims. (Cl. 260—674)

The present invention relates to an improved system for obtaining an extractive distillation separation on each of at least two feed streams boiling in different boiling ranges. More particularly, this invention relates to using the same solvent in each of the extractive distillations, the lean solvent being used first in the extractive distillation separation on the lower boiling feed stream and then in its enriched state being used directly again on the higher boiling stream. Thus, a multiple effect is obtained in the second stage, the solvent enriched with the less volatile material from the first stage being stripped of this material overhead with the second stage raffinate stream. Since these materials in said raffinate stream are from the different boiling range feed streams they may be effectively separated by a further ordinary distillation, thus obtaining the desired four way separation. Most particularly, this invention relates to a combination system for extractively distilling for example butadiene from a $C_4$ cut and isoprene from a $C_5$ cut, wherein the reboiler on the $C_4$ tower, and the overhead condenser on the $C_5$ tower are eliminated. Their function is performed by merely an exchange section of a few plates in the combination tower, the butadiene and $C_5$ raffinate being taken off as separate side streams.

This invention will be more clearly understood from a consideration of the aforementioned separation of butadiene from a $C_4$ stream and isoprene from a $C_5$ stream by extractive distillation. The feed streams for this process may be for example, $C_4$ and $C_5$ cuts from steam cracking of petroleum cuts or selective dehydrogenation of paraffinic or olefinic $C_4$ and $C_5$ cuts. As will be shown, the present process as compared to the prior art separate systems, provides overall equipment savings of one solvent stripper, reduced overhead condensing equipment in one of the extractive distillation towers along with large processing savings in the circulation of solvent required and other utility costs.

Turning now to the conventional prior art extractive distillation processes for the recovery of butadiene from a $C_4$ cut containing olefins and paraffins, the $C_4$ cut is distilled in the presence of a large excess of an extractive distillation agent such as aqueous acetonitrile. In the presence of the acetonitrile, the paraffins and olefins acquire a reasonably large activity coefficient relative to the butadiene. They will therefore go overhead in the extractive distillation tower. The butadiene plus some or all of the butene-2 are removed at the bottom of this tower together with the extractive distillation solvent. This rich solvent is then fed to a solvent stripper where the $C_4$ components are separated from the acetonitrile. The lean solvent from the bottom of the stripper is then recycled to the extractive distillation tower while the $C_4$ overhead is fed to a straight fractionation tower which separates between butadiene overhead and butene-2 bottoms. Some cleanup is carried out on the acetonitrile solvent as it circulates to remove decomposition products, adjust its water content and to remove small amounts of heavier components introduced with the $C_4$ cut, which would tend to accumulate in the circulating solvent. The separated butene-2, together with butanes or butenes taken overhead in the extractive distillation tower, may be passed to dehydrogenation to provide further amounts of butadiene or may be otherwise used. The hydrocarbon products after distillation-separation from the solvent are water washed to remove the remaining acetonitrile from the product. Acetonitrile azeotropes with a number of $C_4$ and $C_5$ hydrocarbons and therefore cannot be separated completely from the hydrocarbon. The wash water is worked up in the solvent purification section to recover the acetonitrile washed out of the product.

When separating isoprene from a $C_5$ cut, a very similar method is used, in this case isoprene is carried down with the solvent in the extractive distillation tower, and the $C_5$ olefins and paraffins are removed overhead in the tower. The isoprene is separated from the solvent in a stripper similarly to the butadiene from the acetonitrile, and again a distillation is carried out to separate the isoprene from small amounts of pentene-2 or 2-methylbutene-2.

As can be seen, this is a complicated setup requiring large circulation of solvent in both systems and the whole scheme involves at least five towers. For the butadiene separation there is an extractive distillation tower, a solvent stripper and a butadiene-butene-2 separator. In the isoprene section there is an extractive distillation tower, a solvent stripper and possibly again an isoprene rerun tower.

A present invention combination system is illustrated in the attached FIGURE I. Again the specific example chosen is the simultaneous separation of butadiene from a $C_4$ cut and the separation of isoprene from a $C_5$ cut.

The $C_4$ cut containing butadiene is fed through line 1 to an extractive distillation tower 2. The $C_4$ raffinate free of butadiene is removed overhead through line 3, condenser 4, line 5 reflux drum 6, and line 7, with a reflux stream being returned to the column through line 8. The butadiene and butene-2 plus solvent are removed at the bottom of the tower through line 9, part of the stream being passed back to the column through line 10, reboiler 11 and line 12. The extractive solvent is supplied to the top of the column preferably several plates below the plate at which the reflux is returned through line 13. The aforementioned bottom stream is passed through line 9 to extractive distillation tower 14 where also a $C_5$ cut is supplied through line 15. In this column an isoprene separation is carried out. By virtue of its higher vapor pressures and the stripping action of the $C_5$ vapors in tower 14, the $C_4$ constituents in the solvent feed will be taken overhead in the tower together with the $C_5$ raffinate. This overhead raffinate is passed through line 15a, condenser 16, line 17, reflux drum 18 and line 19 (a reflux stream being returned to the column through line 20) to ordinary distillation column 21. Here pure butadiene is separated overhead through line 22 and a mixture of butene-2 plus $C_5$ raffinate is taken from the bottom of the column through line 23. Alternatively, if desired the latter two components can be taken off as separate cuts through lines 24 and 23 respectively. The bottoms from the extractive distillation tower 14 containing isoprene plus solvent is passed through line 25, part of the stream being recycled through line 26, reboiler 27, and line 28 back to the column, to solvent stripper 29. Here the isoprene is stripped from the solvent overhead through line 30. This isoprene which is relatively pure of the order of 90–98 wt. percent isoprene may be used as is or may be passed on to further rerun purification. The lean solvent is passed from the bottom of the solvent stripper through line 31. A part of the solvent is recycled without purification directly to extractive distillation tower 2 through line 13 and the remainder is passed through line 32 to solvent purification to remove heavier than $C_5$ hydrocarbons and other contaminants before recycling to the process.

From FIGURE I it thus can be seen that only a single solvent purification system is required in the present invention process, thus only four towers are needed as compared to the conventional five. Overall, the solvent stripper which would ordinarily be needed for the $C_4$ separation cut is eliminated, its function being served by the $C_5$ absorber column.

In another and preferred embodiment the extractive distillations are carried out in a system wherein no reboiler is required on the $C_4$ tower and no condenser is required on the $C_5$ tower. Thus, turning to FIGURE II, a $C_4$ butadiene containing cut is supplied through line 39 to the upper extractive distillation tower section 40 of the combined extractive distillation column 41, lean solvent being supplied to the upper part of said section by line 42. The $C_4$ raffinate free of butadiene is removed overhead through line 43, condenser 44, line 45, reflux drum 46 and line 47, with a reflux stream being returned to the column through line 48. A $C_5$ isoprene containing cut is supplied through line 50 to the lower extractive distillation tower section 51 of the total tower 41. The extracted butadiene material descending in the column passes from the upper extractive distillation tower section 40 into a $C_4/C_5$ exchange section 49. This section is in actuality just a "total reflux section" to interchange the $C_5$ raffinate material rising from the lower extractive distillation tower section 51 of the total extractive distillation tower with the $C_4$ material descending with the liquid solvent stream from section 41. Thus, the solvent by the time it reaches the top of the lower extractive distillation tower section 51 will consist of $C_5$ and solvent and the vapor by the time it reaches the bottom of the upper extractive distillation tower section 41 will be $C_4$ and solvent.

From the lower part of the upper extractive distillation tower section 40 a side stream comprising mainly butadiene is passed through line 52 to clean-up tower 53 which is operated with only a few plates and little reflux to fractionate out the small amount of solvent contained in said side stream. Thus solvent is returned to the extractive distillation column 41 through line 54 and butadiene and butene-2 are passed through line 55 to a further distillation column 56 where butadiene is separated overhead through line 57 from butene-2 removed as bottoms through line 58. A second side stream is taken from the top of the lower extractive distillation tower section 51 comprising mainly $C_5$ raffinate removed from the $C_5$ cut supplied through line 50. This material is passed through line 59 to a clean-up tower 60. This tower is similar to the clean-up tower 53 previously described. From this tower solvent is returned through line 61 and $C_5$ raffinate is passed through line 62 to purification or use as such in other processes such as for example return to a dehydrogenation reactor to make more isoprene. From the bottom of the lower extractive distillation section 51 isoprene plus solvent is passed through line 63, part of the stream being recycled through line 64, reboiler 65 and line 66 back to the column, to solvent stripper 67. Here the isoprene is stripped overhead from the solvent through line 68. Again the isoprene is relatively pure in the order of 90–98 wt. percent. The lean solvent is passed from the bottom of the solvent stripper through line 69. A part of the solvent is recycled without purification directly to the upper extractive distillation section 40 of the column 41 through line 42 and the remainder is passed through line 70 to solvent purification to remove heavier than $C_5$ hydrocarbons and other contaminants before recycling to the process. Although in this embodiment, a single combination tower is described, it is of course contemplated and actually probably would be preferred to use two towers side by side with appropriate vapor and liquid lines interconnecting.

It should be noted that when the two towers are combined as above described that steam and water cooling requirements are practically halved as compared to those required with the FIGURE I system.

It is intended that this invention may be employed wherever it is desired to extractively distill two or more mixtures which have different boiling point ranges and wherein the same solvent, e.g. acetonitrile or acetone containing from 5–25% water, can be used in said distillations.

Typical examples of this would be in the separation of monoolefin, such as ethylene from a $C_2$ cut, propylene from a $C_3$ cut, and butylene from a $C_4$ cut using such solvents as ammonia, acetonitrile, or acetone, furfural, or any selective solvent which raises the relative volatility difference between the components separated. It should be noted that water washes on all of the product streams will probably be required where acetonitrile is used as the solvent, to break the azeotrope between the acetonitrile and the hydrocarbons treated.

A particularly promising application of this invention is the separation of aromatics from a number of hydrocarbon mixtures of different boiling ranges. Thus, product from hydroforming could be separated by fractionation into $C_6$, $C_7$, and $C_8$ boiling range cuts. Furfural, phenol, acetonitrile or similar extractive distillation solvents can then be used to extractively distil each of these cuts in succession as taught by the present invention. Thus, distillation of the $C_6$ cut will result in a benzene free $C_6^-$ raffinate leaving the top of the first extractive distillation tower, while benzene plus solvent is fed to the $C_7$ extractive distillation tower. In that tower benzene plus $C_7$ raffinate is removed overhead, while the solvent will leave the bottom of the tower together with the toluene. Feeding this mixture to the $C_8$ extractive distillation tower will similarly result in a toluene plus $C_8$ paraffin mixture overhead and xylene plus solvent mixture of the bottom. The latter mixture can be separated in the solvent stripper. As can be seen, the benzene and toluene can be separated from their respective mixtures by straight distillation. It is contemplated that this process will provide considerable economies over conventional extractive distillations conducted on product streams from hydroforming to improve octane of the gasoline blending stocks so produced.

The present invention will be more clearly understood from a consideration of the following example of an extractive distillation separation of butadiene from a $C_4$ cut and isoprene from a $C_5$ cut in a system as described in FIGURE I.

*Example*

Solvent composition:
85% acetonitrile (wt.)
15% water

| Item | Extr. Dist. Tower I ($C_4$'s) | Extr. Dist. Tower II ($C_5$'s) |
| --- | --- | --- |
| Feed, LV percent diolefin | [1] 24 | [2] 25 |
| Raffinate, LV percent | 67 | 70 |
| Extract, LV percent | 33 | 30 |
| Tower pressure, p.s.i.g. | 100 | 25 |
| Solvent/HC volume ratio on plates | 3–4/1 | 3–4/1 |
| Reflux/raffinate ratio | 5/1 | 5/1 |
| Plates (actual) | 100 | 80 |
| Diolefin recovery in extract, percent | 99 | 98 |
| Tower top temperature, °F | 150 | 150 |
| Tower bottoms temperature, °F | 290 | 220 |
| Steam requirement, lb./lb. diolefin product | 3 | 3 |
| Cooling water, gal./lb. | 15 | 15 |

[1] Butadiene.
[2] Isoprene.

When the two towers are combined as in FIGURE II the same conditions as above may be used except that steam and cooling water requirements are practically halved, and that the two towers will be operating at the same pressure, say 100 p.s.i.g. This will result in some increase in the plate requirements for the $C_5$ separation.

It is to be understood that this invention is not limited to the specific example, which has been offered merely as an illustration, and that modifications may be made without departing from the spirit of this invention.

What is claimed is:

1. A process for separating hydrocarbons which comprises distilling a lower boiling hydrocarbon mixture containing a lower boiling component selected from the group consisting of ethylene, propylene, butadiene, benzene and toluene in the presence of an extractive solvent in a first zone, withdrawing a vaporous raffinate from said first zone, withdrawing fat solvent containing said lower boiling component from the first zone and passing it to a second zone wherein a higher boiling hydrocarbon mixture containing a higher boiling component corresponding in chemical structure to said lower boiling component is distilled in the presence of the fat solvent thereby replacing substantially all of the lower boiling component in the solvent with the higher boiling component, said higher boiling component being selected from the group consisting of propylene, butylene, isoprene, toluene and xylene, withdrawing a vaporous raffinate from said second zone, separating said replaced component from the raffinate withdrawn from the second zone, withdrawing the solvent containing said higher boiling component from said second zone and distilling the withdrawn solvent thereby separating the higher boiling component from the solvent.

2. The process of claim 1 in which the lower boiling component is butadiene and the higher boiling component is isoprene.

3. The process of claim 1 in which the lower boiling component is ethylene and the higher boiling component is propylene.

4. The process of claim 1 in which the lower boiling component is toluene and the higher boiling component is xylene.

5. The process of claim 1 in which the solvent is acetonitrile, containing from 5–25% water.

6. The process of claim 1 in which the solvent is acetone, containing from 5–25% water.

7. The process of claim 1 in which the solvent is furfural.

8. In a system for obtaining an extractive distillation separation of butadiene from a $C_4$ hydrocarbon stream and of isoprene from a $C_5$ hydrocarbon stream the improvement which comprises extractively distilling the $C_4$ stream in the presence of lean solvent, withdrawing fat containing butadiene solvent from the extractive distillation of the $C_4$ stream, extractively distilling the $C_5$ containing isoprene stream in the presence of said fat solvent, and fractionating the raffinate stream from the extractive distillation of the $C_5$ stream to separate butadiene from $C_5$ raffinate.

9. The process of claim 8 in which the extractive distillation of the $C_5$ stream is conducted in the presence of the entire enriched solvent stream from the extractive distillation of the $C_4$ stream.

10. The process of claim 9 in which the solvent is acetonitrile.

11. The process of claim 9 wherein the raffinate stream from the extractive distillation of the $C_5$ stream is fractionated to separate butadiene from butene-2, and butene-2 from $C_5$ raffinate.

12. The process of claim 8 in which the entire enriched solvent stream from the extractive distillation of the $C_4$ stream, is countercurrently exchanged with the vaporized raffinate from the extractive distillation of the $C_5$ stream to obtain vaporization of the material extracted from the $C_4$ stream and condensation of the $C_5$ stream raffinate, and in which substantially all of the solvent from said countercurrent exchange is supplied to the extractive distillation of the $C_5$ stream.

13. The process of claim 12 in which said countercurrent exchange between the enriched solvent and vaporized raffinate is obtained by distillation.

14. The process of claim 13 in which as least a substantial part of the vaporized material extracted from the $C_4$ stream and at least a substantial part of the condensed $C_5$ raffinate from said countercurrent exchange are separately withdrawn as vapor streams from said countercurrent exchange distillation.

References Cited in the file of this patent

UNITED STATES PATENTS

| 2,379,332 | Arnold | June 26, 1945 |
| 2,426,706 | Patterson | Sept. 2, 1947 |